United States Patent [19]

Watanabe et al.

[11] Patent Number: 4,950,144
[45] Date of Patent: Aug. 21, 1990

[54] NOZZLE TOUCH APPARATUS IN AN INJECTION MOLDING MACHINE

[75] Inventors: Kikuo Watanabe, Minamitsuru; Masaki Muranaka, Shibuya, both of Japan

[73] Assignee: Fanuc LTD, Minamitsuru, Japan

[21] Appl. No.: 315,685

[22] PCT Filed: Jul. 30, 1988

[86] PCT No.: PCT/JP88/00768
§ 371 Date: Feb. 14, 1989
§ 102(e) Date: Feb. 14, 1989

[87] PCT Pub. No.: WO89/00913
PCT Pub. Date: Feb. 9, 1989

[30] Foreign Application Priority Data

Aug. 1, 1987 [JP] Japan .................. 62-191517

[51] Int. Cl.$^5$ ............................................. B29C 45/07
[52] U.S. Cl. ........................ 425/135; 264/328.11; 425/155; 425/171; 425/569; 425/574
[58] Field of Search ............ 425/569, 574, 145, 135, 425/155, 156, 567, 149, 170, 171; 264/328.11, 328.13

[56] References Cited

U.S. PATENT DOCUMENTS

| 3,538,549 | 11/1970 | Hehl | 425/145 |
| 3,888,388 | 6/1975 | Mahoney | 425/145 |
| 4,299,791 | 11/1981 | Aoki | 425/558 |
| 4,676,730 | 6/1987 | Yamasaki | 425/569 |
| 4,836,962 | 6/1989 | Aoki | 425/145 |

FOREIGN PATENT DOCUMENTS

| 58-168538 | 10/1983 | Japan | 425/145 |
| 60-259419 | 12/1985 | Japan | 425/574 |
| 61-68216 | 4/1986 | Japan . | |
| 61-76334 | 4/1986 | Japan | 425/574 |
| 62-80014 | 4/1987 | Japan | 425/574 |

Primary Examiner—Jay H. Woo
Assistant Examiner—James P. Mackey
Attorney, Agent, or Firm—Staas & Halsey

[57] ABSTRACT

A nozzle touch apparatus in an injection molding machine is provided, which is capable of preventing deformation of a stationary mold half due to a nozzle touch force applied thereto, and of making it possible to use a mold of a type liable to be deformed for production of precise molding products. Springs interposed between a seat plate of the nozzle touch apparatus and a projecting wall of an extruder base generate the nozzle touch force which varies in magnitude as a function of a compressed amount of the springs. Upon a mold lockup state being released, a ball screw is rotatively driven, so that the seat plate, which is integral with a ball nut engaged with the ball screw, retreats from its moved position at the mold lockup state, to reduce the nozzle touch force and prevent deformation of the mold.

8 Claims, 3 Drawing Sheets

4,950,144

NOZZLE TOUCH APPARATUS IN AN INJECTION MOLDING MACHINE

TECHNICAL FIELD

The present invention relates to a nozzle touch apparatus in an injection molding machine, in which a spring is compressed to generate a nozzle touch force, and more particularly to a nozzle touch apparatus arranged to change the nozzle touch force with progress of the injection molding cycle so as to prevent deformation of a stationary half of a mold.

BACKGROUND ART

Typically, in a conventional nozzle touch apparatus for use in an electrically-operated injection molding machine, a ball screw coupled to a motor via a speed-reducing gear is rotated to axially move a ball nut threadedly engaged therewith. A spring which is interposed between a spring seat member, arranged for movement in unison with an injection unit, and a movable spring sat member, arranged for movement in unison with the ball nut, is compressed. The rotation of the motor is then stopped and at the same time a brake is actuated when a predetermined compressed amount of the spring is reached, to hold the spring in the compressed state so as to maintain the spring force, or the nozzle touch force, to be applied to the injection unit.

In this case, the nozzle touch force is kept constant during the injection molding cycle. Thus, the nozzle touch force sometimes becomes excessive in magnitude for some kinds of molds used for injection molding.

More specifically, when the mold is in its lockup state in injection and hold processes of the injection molding cycle, a stationary mold half 100 mounted on stationary platen and a movable mold half 101 are urged in contact with each other, as shown in FIG. 2. Thus, the stationary mold half 100 is not deformed even if a rather excessive nozzle touch force f is applied thereto. On the other hand, during metering and eject processes and up to completion of the mold clamping process (that is, during a section of the injection molding cycle where the mold lockup state is released), the movable mold half 101 provides the stationary mold half 100 with no substantial urging force, or is disposed out of contact with the stationary mold half, as shown in FIG. 3. In this mold lockup released state, the stationary mold half 100 is urged towards the movable mold half 101 when an excessive nozzle touch force f is applied thereto. Thus, the stationary mold half 100 can be deformed. Actually, in the case of using a hot runner type mold in an electrically-operated injection molding machine, since the mold of this kind is formed with a number of cavities for prevention of heat transfer from a heated manifold to its peripheral parts and is liable to be deformed, in particular, at the manifold, this mold can be deformed by virtue of an excessive urging force, i.e., nozzle touch force generated by the nozzle in the lockup released section in the injection molding cycle such as the mold-opening process.

With regard to this point, a hydraulic injection molding machine has mold clamping and injection apparatuses whose respective hydraulic cylinders are connected to a common hydraulic pressure source, so that a force applied to the movable mold half is balanced with a force applied to the nozzle. That is, during the injection process, for instance, on one hand, the nozzle is urged in contact with the stationary mold half with a great nozzle touch force, and on the other hand, the movable mold half is urged in contact with the stationary mold half with a mold clamping force which is exerted in an opposite direction to a direction along which the nozzle touch force is exerted. Further, during metering and eject processes, both of the nozzle and the movable mold half never apply a force to the stationary mold half. At any rate, an equilibrium-of-force relationship is always established between the both sides of the stationary mold half.

However, in the electrically-operated injection molding machine where the clamping apparatus and the nozzle touch apparatus are separately driven by independent motors, it is difficult to balance forces applied from these apparatuses to the stationary mold half.

SUMMARY OF THE INVENTION

The object of the present invention is to provide a nozzle touch apparatus which is arranged to generate a nozzle touch force by compressing a spring, and which is capable of preventing deformation of a stationary mold half caused by an excessive nozzle touch force.

According to the present invention, there is provided a nozzle touch apparatus for use in an injection molding machine having an injection unit disposed for reciprocal movement. The nozzle touch apparatus comprises a movable spring seat member disposed for reciprocal movement, a drive means for causing the movable spring seat member to be reciprocated, a stationary spring seat member arranged to be movable in unison with the injection unit and arranged opposite the movable spring seat member, and a spring interposed between the stationary spring seat member and the movable spring seat member, whereby the nozzle touch force generated by the spring is variably changed by changing a moved position of the movable spring seat member.

An advantage of the present invention is that the nozzle touch force can be variably changed, and, for instance, the nozzle touch force in the mold lockup released state can be decreased to a value less than that in the mold lockup state. This makes it possible to avoid deformation of the stationary mold half. Thus, no substantial problems are found in manufacturing precise molding products and in employing a mold of a kind liable to be deformed, such as a hot runner type of mold, in an electrically-operated injection molding machine of the type utilizing a spring force to generate the nozzle touch force.

DETAILED DESCRIPTION OF THE PREFERRED EMBODIMENTS

Figure 4:
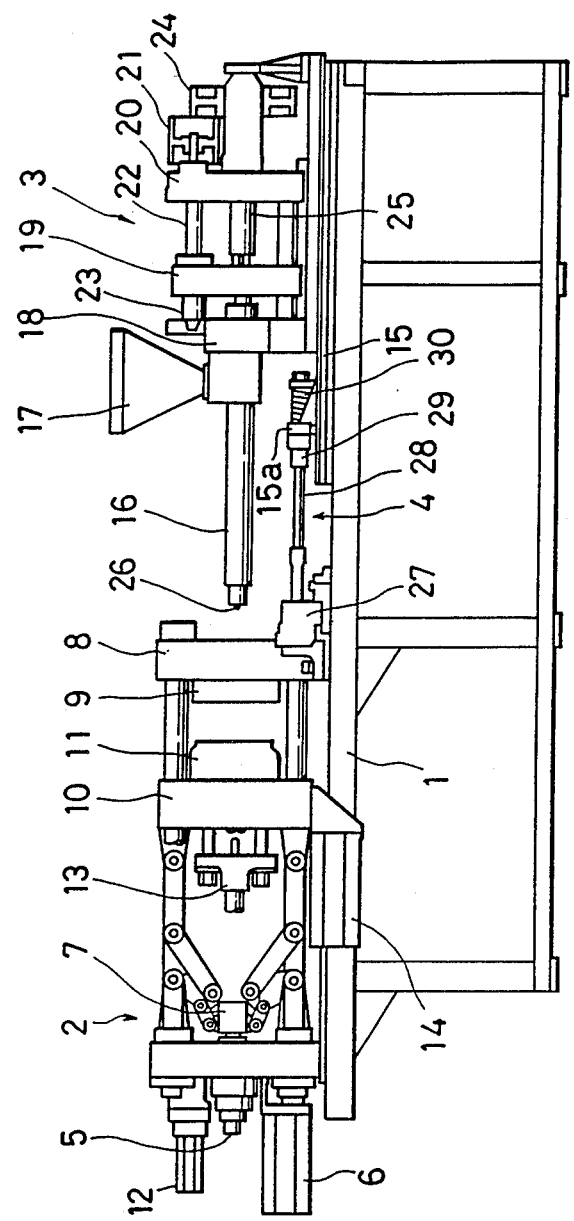
FIG. 4 is a schematic front view of an electrically-operated injection molding machine equipped with the nozzle touch apparatus of FIG. 1

In FIG. 4, a mold clamping unit 2 is secured to a frame base 1, and an injection unit 3 is disposed on the frame base 1 for reciprocal movement in unison with an extruder base 115 and disposed opposite the mold clamping unit 2, with the injection unit 3 coupled to the mold clamping unit 2 via a nozzle touch apparatus 4.

The mold clamping unit 2 is of a toggle type having a mold clamping servometer 6 for rotatively driving a mold clamping ball screw 5 to cause reciprocal movement of a ball nut 7 fixed to a crosshead of a toggle mechanism, to thereby perform mold clamping and mold opening operations. A stationary mold half 9 and a movable mold half 11 are mounted on a stationary platen 8 and a movable platen 10, respectively. Reference numeral 12 denotes a servomotor for mold thickness adjustment; 13, an ejector; and 14, a servomotor for driving the ejector.

The injection unit 3 is placed on the extruder base 15, which is arranged to be movable on the frame injection unit 3 comprises a front plate 18 having an injection cylinder 16 and a hopper 17, and a movable plate 19 to which a metering screw (not shown), disposed within the injection cylinder, is coupled in a manner to be movable in unison therewith. The movable plate 19 is disposed for reciprocal movement between the front plate 18 and a rear plate 20, and is operatively coupled to a servomotor, not shown, via a pulley 21, an injection ball screw 22, and a ball nut 23 fixed to the movable plate 19. Further, the metering screw is operatively coupled to a different servomotor, not shown, via a pulley 24 and a ball spline 25 for screw rotation. Reference numeral 26 designates a nozzle provided at a tip end of the injection cylinder.

Figure 1:
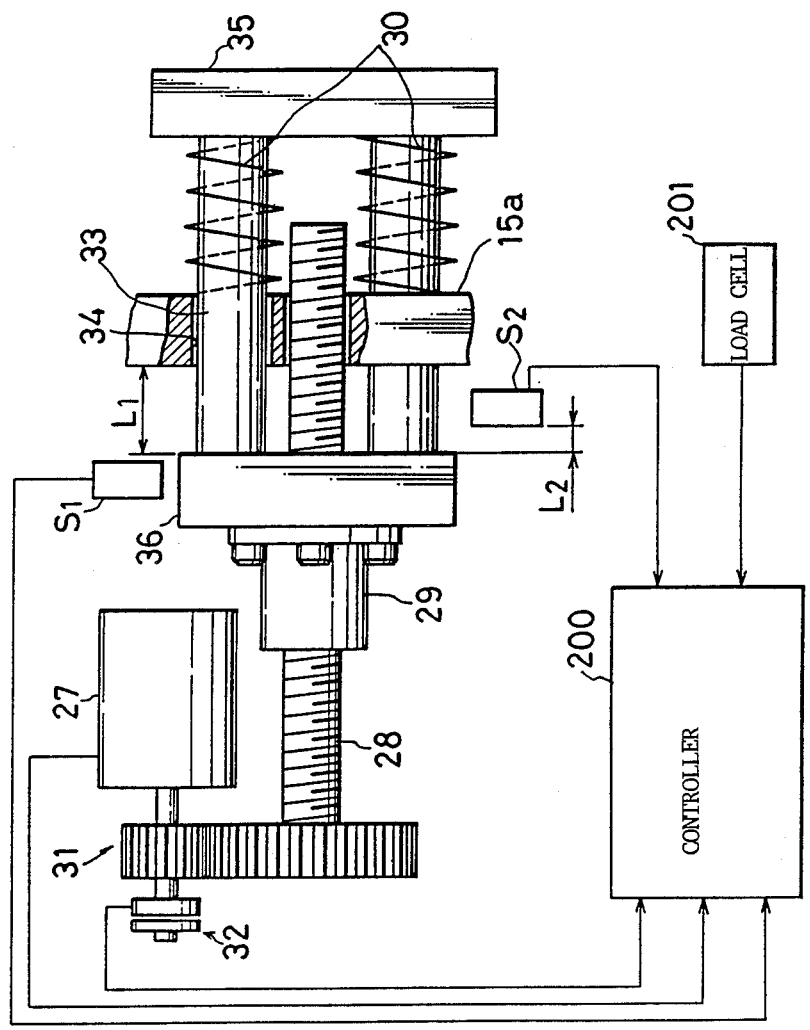
FIG. 1 is a schematic front view of a nozzle touch apparatus according to an embodiment of the present invention.
Figures 2, 3:
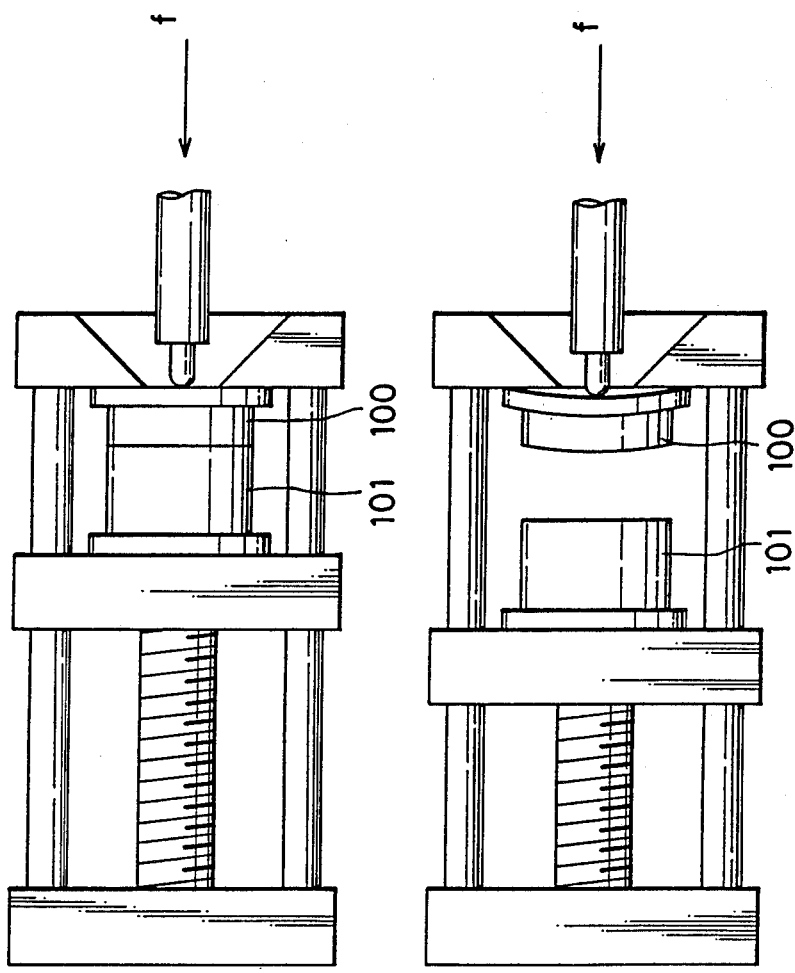
FIG. 2 is a schematic front view of a mold clamping unit in a mold lockup state.
FIG. 3 is a view, similar to FIG. 2, showing a lockup released state.

The nozzle touch apparatus 4 comprises a motor 27 fixed on the frame base 1 at the side of the stationary platen 8, a nozzle touch ball screw 28 driven by the motor 27, a ball nut 29 provided at the extruder base side and threadedly engaged with the ball screw 28, and springs 30 for generating the nozzle touch force, As shown in FIG. 1, the motor 27 is equipped with a speed-reducing gear 31 and a brake 32. A plurality of guide rods 33, formed integrally with the ball nut 29, slidably extend through holes 34 which are axially formed in a projecting wall (stationary spring seat member) 15a of the extruder base 15. Further, the springs 30, fitted around the guide rods 33, are interposed between a seat plate 35, as a movable spring seat member which is fixed on respective first ends of the guide rods 33, and the projecting wall 15a of the extruder base 15. That is, the springs 30 are interposed between the ball nut 29, which is moved by driving the motor 27, and the extruder base wall 15a serving as a portion which is moved in unison with the injection unit 3 upon execution of nozzle touch process.

Reference numerals S1 and S2 denote proximity switches for detecting the position of a dog 36 which is arranged to be movable together with the ball nut 29. More specifically, the switches S1 and S2 serve to detect the forward and rearward moved positions of the dog 36 after completion of the nozzle touch process, respectively.

In the following, the operation of the injection molding machine will be explained.

A preparation for entering the injection molding cycle is performed by filling a molding material into the hopper 17 of the injection unit 3, performing a purging operation, and mounting the stationary and the movable mold halves 9 and 11 in their clamped state, for instance. Thereafter, the operation of the nozzle touch apparatus 4 is started, so that the injection unit 3 is moved along the frame base 1 toward the mold clamping unit 2 together with the extruder base 15, to achieve a nozzle touch state where the nozzle 26 provided at the tip end of the injection unit 3 is in contact with a sprue bushing of the stationary mold half 9 mounted on the stationary platen 8.

More specifically, referring to FIG 1, the brake 32 is rendered inoperative, and then the servomotor 27 is driven to rotatively drive the nozzle touch ball screw 28 so as to move the ball nut 29, engaged with the ball screw 28, in the forward direction (to the left in FIG. 1). With this forward movement of the ball nut 29, the seat plate 35 which is integral with the nut 29 through the guide rods 33 is moved forwardly, and thus the extruder base 15 and the injection unit 3, which are operatively coupled with the seat plate 35 through the medium of the springs 30, are advanced for nozzle touch, with the springs 30 compressed.

The rotation of the motor 27 is continued until after the nozzle touch state is achieved. Further, in case that the mold clamping has been completed and the mold has assumed its lockup state at completion of the nozzle touch process (here, this condition is fulfilled), the motor 27 continues to rotate even when the dog 36 is detected by the switch S2, so that the nozzle touch force generated by the nozzle 26 and applied to the stationary mold half 9 is gradually increased. When the dog 36 is detected by the switch S1, the motor 27 is stopped, and at the same time, the brake 32 is operated so as to maintain that state. At this time, the nozzle touch force, generated by the greatly compressed springs 30, is large enough to compete with a reaction force from a molten resin during injection and hold processes. Then, the injection and hold processes, which belong to the mold lockup section of the injection molding cycle, are entered.

The electrically-operated injection molding machine comprises a controller 200 for controlling the injection molding cycle, etc., which controller is arranged to determine the mold lockup state when a pressure value, detected by a pressure sensor such as a load cell 201 provided in the mold clamping unit, is larger than a preset value.

Upon completion of the injection and hold processes, the lockup state is released and the pressure value detected by the load cell 201 is decreased to a value less than the preset value. Accordingly, the mold lockup released section of the injection molding cycle is determined, and the brake 32 is rendered inoperative and then the motor 27 is rotated reversely so that the ball nut 29 is moved in the rearward direction. When an amount of this rearward movement becomes equal to a value of L2, as shown in FIG. 1, the dog 36 is detected by the switch S2, and the rotation of the motor 27 is stopped, and then the brake 32 is operated. As a consequence, the springs 30, which has been compressed to have the length of L1, are extended by L2, so that the nozzle touch force is decreased. With this state, the molding cycle processes other than the injection and hold processes, such as metering and eject processes (corresponding to the lockup released section) are entered.

When the injection molding cycle is continued, the mold clamping process is entered again. In this process, when the stationary and movable mold halves 9, 11 are clamped to each other, and this mold lockup state is detected, the motor 27 is rotated in the forward direction, so that the ball nut 29 is advanced from the location where the dog 36 faces the switch S2, to increase the nozzle touch force. Thereafter, the injection and hold processes are entered. In this manner, the injection molding cycle is repetitively carried out. That is, in the ordinary injection molding cycle, the ball nut 29 is moved so that the dog 36 is reciprocated between the switches S1 and S2.

To be noted, the switch S2 is set to a position short of a location at which the springs 30 are fully extended or in its free state, so as to generate a desired nozzle touch force which never causes deformation of the stationary mold half 9 even in the mold lockup released section of the injection molding cycle. This makes is possible to avoid leakage of the molten resin from a portion at which the mold and the nozzle are joined, at the time of the lockup released section of the injection molding cycle being carried out (particularly, in the case of the hot runner type mold).

When the injection molding cycle is stopped, in response to an operation of a manual switch or supply of a command from the controller 200 for releasing the nozzle touch state, the brake 32 is rendered inoperative and then the motor 27 is rotated in the reverse direction to cause the ball nut 29 to retreat. Thereafter, the springs 30 are brought into its fully extended state, and then the ball nut 29 urges the projecting wall 15a of the extruder base 15 to thereby retreat the injection unit 3 from its nozzle touch position up to a position where the injection unit 3 is capable of being swiveled.

As a modification of the aforementioned embodiment, an induction motor may be employed as the motor 27, and a timer for setting the distance L2 by which the springs 30 are extended may be employed in place of the switch S2. More specifically, a time period required for movement of the dog 36 by the distance of L2 can be calculated because the rotational rate of the induction motor is kept constant, and the reduction ratio of the speed-reducing gear as well as the lead value of the nozzle touch ball screw in the mechanism for transfer of the ball nut 29, are known. Accordingly, the magnitude of nozzle touch force can be adjusted by setting the above-mentioned timer period in the controller of the injection molding machine, and delivering a command each time a shift is made from the mold lockup section of the injection molding cycle to the lockup released section thereof, or vice versa, so that the induction motor 27 is rotated for the thus set time period in the forward or reverse direction. This modification only requires inputting a program for executing the above-mentioned process into the controller of the injection molding machine, and is advantageous from an economic standpoint.

In the case of employing a servomotor as the motor 27, the magnitude of nozzle touch force in the respective sections of the injection molding cycle can be adjusted in manner similar to the aforementioned modification, by utilizing a predetermined relationship between the rotational rate of the servomotor and the amount of movement of the ball nut, and by setting the rotational rate of the servomotor required for moving the ball nut by the distance of L2 into the controller of the injection molding machine.

We claim:

1. A nozzle touch apparatus for use in an injection molding machine having an injection unit disposed for reciprocal movement, comprising:
    a movable spring seat member disposed for reciprocal movement from a first moved position to a second moved position;
    means for setting and detecting the first moved position and the second moved position of said movable spring seat member;
    drive means for causing said movable spring seat member to be reciprocated, said drive means being operable to cause said movable spring seat member to be at the first moved position, when a mold lockup released state is established, and a second moved position, when a mold lockup state is established;
    a stationary spring seat member arranged to be movable in unison with said injection unit and arranged opposite said movable spring seat member; and
    a spring interposed between said stationary spring seat member and said movable spring seat member, a compressed state of said spring being dependent upon the position of said movable spring seat member, said compressed state generating a nozzle touch force, whereby the nozzle touch force generated by said spring in the mold lockup released state in which said movable spring seat member is at the first moved position is less than that in the mold lockup state in which said movable spring seat member is at the second moved position.

2. A nozzle touch apparatus according to claim 1, wherein said drive means comprises:
    a ball nut which is integral with said movable spring seat member, a ball screw which is threadedly engaged with said ball nut, and a motor for rotatively driving said ball screw.

3. A nozzle touch apparatus according to claim 2, wherein said setting and detecting means includes a dog which is integral with said ball nut, and a plurality of switches for detecting different moved positions of said dog.

4. A nozzle touch apparatus according to claim 1, wherein said injection molding machine has a stationary mold half which is deformable when an excessive nozzle touch force is applied thereto when the mold lockup released state is established, said movable spring seat member causing said spring to be in such a compressed state that said spring never generates a a nozzle touch force by which said stationary mold half is deformed, when said movable spring seat member is at the first moved position in the mold lockup released state.

5. A nozzle touch apparatus according to claim 2, wherein the motor is a servomotor which rotates at a rate set for moving the ball nut between a first ball nut position and a second ball nut position.

6. A nozzle touch apparatus according to claim 2, wherein the motor is an induction motor, and further comprising a timer for setting a time period for rotating the induction motor an amount sufficient to move the ball nut between a first ball nut position and a second ball nut position.

7. A nozzle touch apparatus according to claim 3, further comprising:
    a speed reducing gear between the motor and the ball screw, a brake operatively connected to the motor, a mold lock up pressure sensor, and a controller for receiving signals from said plurality of switches and said pressure sensor and for activating and deactivating the brake.

8. A nozzle touch apparatus according to claim 1, wherein said apparatus is mounted on an injection molding machine which comprises an electrically-operated injection unit and an electrically-operated mold clamping unit.

* * * * *